(12) United States Patent
Chu et al.

(10) Patent No.: US 10,846,041 B2
(45) Date of Patent: Nov. 24, 2020

(54) AUDIO AND VIDEO PROCESSORS

(71) Applicants: Tao-Sheng Chu, Taipei (TW); Maureen Min-Chaun Lu, Taipei (TW); Yl-Ling Lo, Taipei (TW); Victor Lee, Sunnyvale, CA (US); Chan-Liang Lin, Taipei (TW); Candy Wu, Taipei (TW); Hewlett-Packard Development Company, L.P., Houston, TX (US)

(72) Inventors: Tao-Sheng Chu, Taipei (TW); Maureen Min-Chaun Lu, Taipei (TW); Yl-Ling Lo, Taipei (TW); Victor Lee, Sunnyvale, CA (US); Chan-Liang Lin, Taipei (TW); Candy Wu, Taipei (TW)

(73) Assignee: Hewlett-Packard Development Comany, L.P., Spring, TX (US)

( * ) Notice: Subject to any disclaimer, the term of this patent is extended or adjusted under 35 U.S.C. 154(b) by 0 days.

(21) Appl. No.: 15/557,026

(22) PCT Filed: May 18, 2015

(86) PCT No.: PCT/CN2015/079154
§ 371 (c)(1),
(2) Date: Sep. 8, 2017

(87) PCT Pub. No.: WO2016/183763
PCT Pub. Date: Nov. 24, 2016

(65) Prior Publication Data
US 2018/0095706 A1    Apr. 5, 2018

(51) Int. Cl.
*G06F 3/14*    (2006.01)
*H04N 21/436*    (2011.01)
(Continued)

(52) U.S. Cl.
CPC ............ *G06F 3/14* (2013.01); *H04N 21/439* (2013.01); *H04N 21/4385* (2013.01); *H04N 21/43635* (2013.01); *H04N 21/44* (2013.01)

(58) Field of Classification Search
CPC ............... H04N 21/41; H04N 21/4122; H04N 21/42204; H04N 21/42206; H04N 21/4302; H04N 21/43615
(Continued)

(56) References Cited

U.S. PATENT DOCUMENTS 7,675,574 B2    3/2010 Ishii et al.
8,704,833 B2 *  4/2014 Cox ..................... G09G 5/006
                                                    345/501

(Continued)

FOREIGN PATENT DOCUMENTS

CN    1452435 A    10/2003
CN    1710957 A    12/2005
(Continued)

OTHER PUBLICATIONS

EIZO Corporation.—"Making Full Use of the "External" LCD with Laptop Computers," Apr. 28, 2011, pp. 1-8.

*Primary Examiner* — Dominic D Saltarelli
(74) *Attorney, Agent, or Firm* — HP Inc. Patent Department (57) ABSTRACT

An example electronic device includes: an audio and video (AV) processor, a computer subsystem, a control mechanism, and a media playing device. The AV processor includes an AV input port to receive external AV signals from an external media source. The computer subsystem is to provide internal AV signals to the AV processor. The control mechanism is to control the AV processor to select between the external AV signals and the internal AV signals, and enable the AV processor to transmit selected AV signals to the media playing device. The media playing device is to play the selected AV signals.

13 Claims, 10 Drawing Sheets

(51) Int. Cl.
*H04N 21/438* (2011.01)
*H04N 21/439* (2011.01)
*H04N 21/44* (2011.01)
*H04N 21/4363* (2011.01)
*H04N 21/4385* (2011.01)

(58) Field of Classification Search
USPC .......................................................... 725/151
See application file for complete search history.

(56) References Cited

U.S. PATENT DOCUMENTS

| | | |
|---|---|---|
| 2005/0166241 A1 | 7/2005 | Kim et al. |
| 2006/0093310 A1 | 5/2006 | Hung |
| 2006/0161961 A1* | 7/2006 | Brotz ..................... H04N 7/163 |
| | | 725/113 |
| 2010/0008651 A1* | 1/2010 | Yonekura ........... H04N 21/4147 |
| | | 386/200 |
| 2012/0159287 A1 | 6/2012 | Odinak |
| 2013/0298174 A1* | 11/2013 | Palm ....................... H04L 12/12 |
| | | 725/80 |
| 2014/0204270 A1 | 7/2014 | Cox et al. |
| 2015/0365386 A1* | 12/2015 | Sallas ................... H04L 63/061 |
| | | 713/171 |

FOREIGN PATENT DOCUMENTS

| | | |
|---|---|---|
| CN | 101714021 A | 5/2010 |
| CN | 202261632 U | 5/2012 |
| CN | 104346121 A | 2/2015 |
| TW | I261178 | 9/2006 |
| TW | I297452 | 6/2008 |
| TW | 201506775 A | 2/2015 |

* cited by examiner

AUDIO AND VIDEO PROCESSORS

BACKGROUND

Nowadays, most electronic devices may have a media playing part for presenting audio and/or video signals to their users or consumers. In an example, the media playing part may be a video output device for displaying video signals. The video output device may be such as a monitor, or a built-in or integrated display of an electronic device, or an external display connected to a computer part of the electronic device via such as a video graphics array (VGA) cable, etc. In an example, the media playing part may be an audio output device for playing audio signals, such as sounds and music. The audio output device may be a speaker, a headphone, a stereo, an earphone terminal, a line-out terminal, etc. In an example, the media playing part may be a device, such as a television (TV), which integrates both video output functions and audio output functions.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which components or procedures shown in the figures are not necessarily essential for implementing the present disclosure. In other instances, well-known methods, procedures, modules, units, and circuits have not been described in detail so as not to unnecessarily obscure features of the examples.

When a computer part of an electronic device is not functioning, a media playing part of the electronic device may not work, as well. That is, the media playing part cannot function separately when the computer part is not powered on.

In view of the above, an electronic device may be provided as an example of the present disclosure, which can play audio and video (AV) signals received from external media sources, using its media playing part while its computer part is powered on or powered off. That is, the operation of the media playing part may be independent from that of the computer part. In an example, the computer part of the electronic device is powered off may refer to a status that the computer part is not powered on or not functioning. Specifically, the computer part is powered off may include a status that the computer part is shut down, or the computer part is sleep or standby, or the computer part is suspended, or the computer part is in malfunction. In this way, the electronic device may act as a multimedia center capable of playing AV signals even when the computer part is not functioning. A user can view and listen to content of the AV signals received from the external media source on the electronic device's display and through its speaker.

In an example, the electronic device may be a smartphone, a notebook, a laptop, or an all-in-one personal computer (PC). In an example, the all-in-one PC may integrate the electronic device's internal components into the same case as a display, eliminating some connecting cables and allowing for a smaller footprint, sometimes giving a degree of portability, compared to the standard desktop configuration having separate cases for the display and the computer part. The computer part may refer to components of the electronic device that can realize general computer functions. The media playing part may refer to components of the electronic device that can realize media playing functions, such as playing audio signals or displaying video signals, or combination thereof. The external media source may be a device separate from the electronic device that can output AV signals. In an example, the external media source may be a game console, a set-top box, a media player, a digital television (DTV), a smart phone, or another electronic device distinct from the electronic device having the media playing part, etc.

Figure 1:
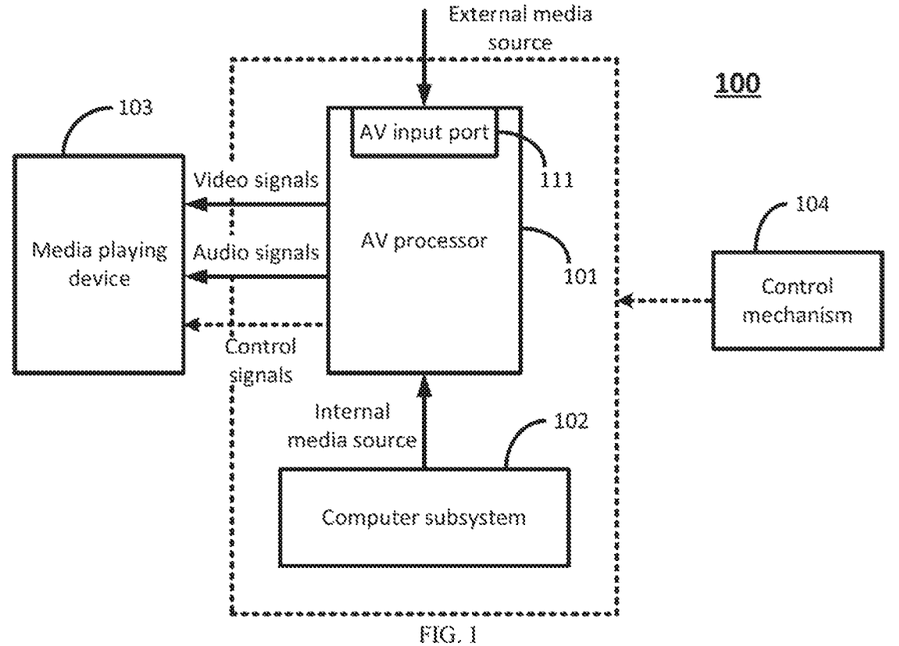
FIG. 1 is a block diagram illustrating an electronic device that shares its media playing part with an external media source in accordance with an example of the present disclosure.

FIG. 1 is a block diagram illustrating an electronic device 100 that shares its media playing part with an external media source in accordance with an example of the present disclosure. The electronic device 100 may include: an AV processor 101, a computer subsystem 102, a media playing device 103, and a control mechanism 104.

The AV processor 101 may include an AV input port 111 to receive external AV signals from an external media source. In an example, the external AV signals may be such as a high definition multimedia interface (HDMI) input. The computer subsystem 102 may provide internal AV signals to the AV processor 101. To distinct from the external media source, the computer subsystem 102 may be considered as an internal media source. The control mechanism 104 may control the AV processor 101 to select between the external AV signals and the internal AV signals, and enable the AV processor 101 to transmit selected AV signals to the media playing device 103. The media playing device 103 may play the selected AV signals. In an example, the selected AV signals may either be the external AV signals, or the internal AV signals.

In an example, the control mechanism 104 may instruct the AV processor 101 to select the external audio and video signals, and the media playing device 103 may play the external audio and video signals. In an example, the control mechanism 104 may instruct the AV processor 101 to select the internal audio and video signals, and the media playing device 103 may play the internal audio and video signals.

In an example, the media playing device 103 may include a video output device to display video signals, and an audio output device to play audio signals. Accordingly, the control mechanism 104 may instruct the AV processor 101 to select the external audio signals and the internal video signals, and the audio output device is to play the external audio signals, and the video output device is to display the internal video signals. In another example, the control mechanism 104 may instruct the AV processor 101 to select the internal audio signals and the external video signals, and the audio output device is to play the internal audio signals, and the video output device is to display the external video signals.

As shown in FIG. 1, the electronic device 100 may be designed to function as a media playing device 103 for external media sources when the computer subsystem 102 of the electronic device 100 is not powered on. In this way, users don't need to turn on the computer subsystem 102 of the electronic device 100 and wait a relatively longer time to play external audio and video content.

Figure 2:
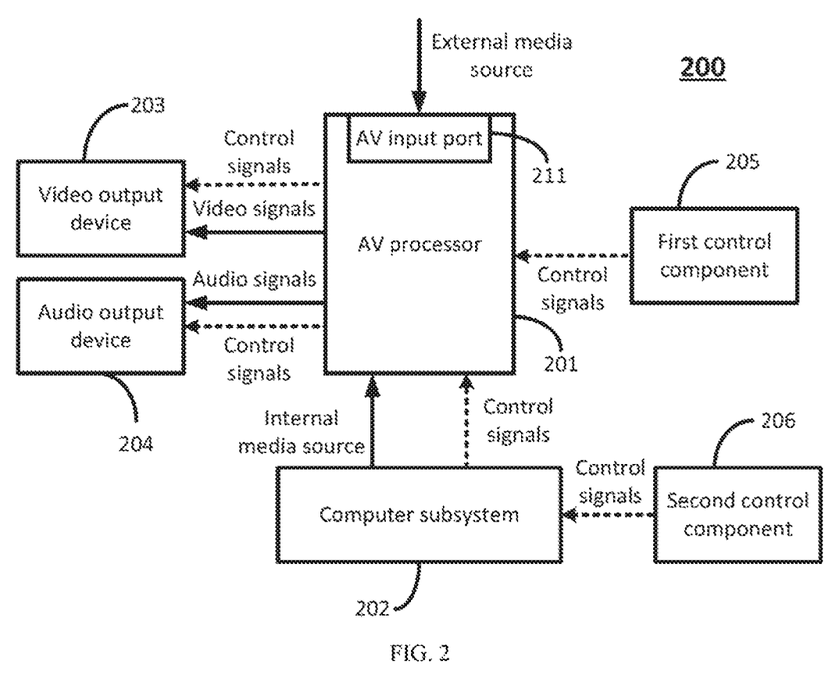
FIG. 2 is a block diagram illustrating an electronic device having two control components for sharing a media playing part with an external media source in accordance with an example of the present disclosure.

FIG. 2 is a block diagram illustrating an electronic device 200 having two control components for sharing a media playing device with an external media source in accordance with an example of the present disclosure. In an example, the electronic device 200 may include: an AV processor 201, a computer subsystem 202, a video output device 203, an audio output device 204, a first control component 205, and a second control component 206.

In an example, the first control component 205 is coupled to the AV processor 201. The first control component 205 is to instruct the AV processor 201 to select between external AV signals and internal AV signals. The external AV signals may be received from the external media source via an AV input port 211. Whenever the computer subsystem 202 is powered on or off, the first control component 205 can control the selection of media sources. In an example, the second control component 206 is coupled to the computer subsystem 202 and to instruct the AV processor 201 to select between external AV signals and internal AV signals. When the computer subsystem 202 is not powered on, the second control component 206 may not function.

Further, either the first control component 205 or the second control component 206 may adjust audio parameters of the audio output device 204, and to adjust video parameters of the video output device 203. In an example, the audio parameters may include such as audio volume value and audio mute status, and the video parameters may include such as video brightness value. The volume of the audio output device 204 may be turned up or down according to the audio volume value. The audio mute status may be muting (indicated as "off") or not mute (indicated as "on") of the audio output device 204.

Figure 3:
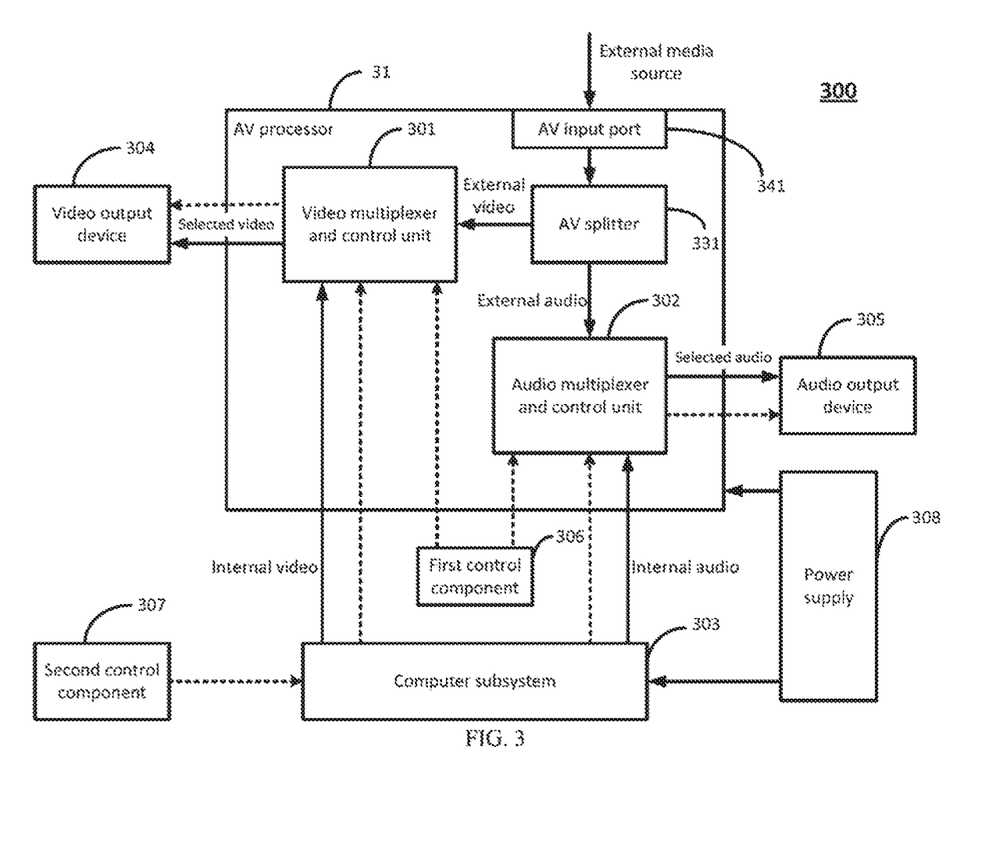
FIG. 3 is a block diagram illustrating an electronic device for sharing audio output devices and video output devices with an external media source in accordance with an example of the present disclosure.

FIG. 3 is a block diagram illustrating an electronic device 300 for sharing audio output devices and video output devices with an external media source in accordance with an example of the present disclosure. The electronic device 300 may include: an AV processor 31, a computer subsystem 303, a video output device 304, an audio output device 305, a first control component 306, a second control component 307, and a power supply 308.

The AV processor 31 may include: a video multiplexer and control unit 301, an audio multiplexer and control unit 302, an AV splitter 331, and an AV input port 341. The AV input port 341 may receive external AV signals from an external media source. In an example, a plurality of AV input ports 341 may be configured on the AV processor 31, to connect multiple external media sources with different AV formats. A possible format of the external media source may be HDMI input. The external AV signals may be transmitted to the AV splitter 331 and split into external audio signals and external video signals.

The computer subsystem 303 may include a general purpose processor for handling major computational work of the electronic device 300. The general purpose processor can include any type of processor, including, but not limited to, a microprocessor, a mainframe computer, a digital signal processor, a personal organizer, a device controller, and a computational engine within an appliance.

The external video signals may be sent to the video multiplexer and control unit 301. The video multiplexer and control unit 301 may also receive internal video signals from the computer subsystem 303, and provide selected video signals to the video output device 304. The selected video signals may be determined according to control signals sent from either the first control component 306 or the second control component 307. In an example, the selected video signals may be one of the external video signals and the internal video signals.

The external audio signals may be sent to the audio multiplexer and control unit 302. The audio multiplexer and control unit 302 may also receive internal audio signals from the computer subsystem 303, and provide selected audio signals to the audio output device 305. The selected audio signals may be determined according to control signals sent from either the first control component 306 or the second control component 307. In an example, the selected audio signals may be one of the external audio signals and the internal audio signals.

The power supply 308 may provide power to other parts of the electronic device 300. In an example, the AV processor 31 and the computer subsystem 303 may get power input from the power supply 308 separately, to ensure that the power status of the AV processor 31 may not be affected by that of the computer subsystem 303. In an example, when the computer subsystem 303 is powered off, the AV processor 31 may be powered on to play an external media source on the video output device 304 and the audio output device 305.

Figure 4:
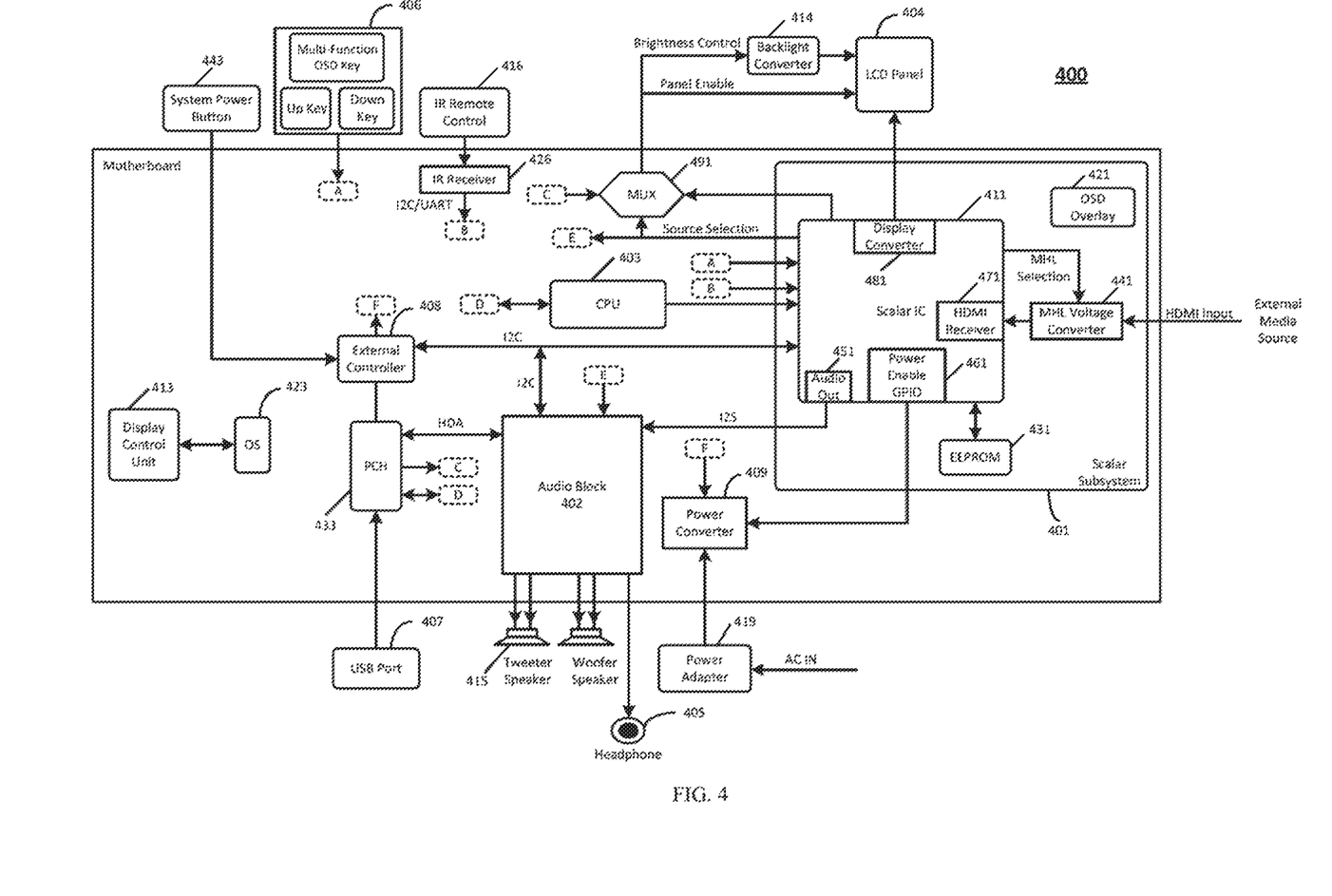
FIG. 4 is a block diagram illustrating an electronic device having a high definition multimedia interface (HDMI) input for playing external AV signals from an external media source in accordance with an example of the present disclosure.

FIG. 4 is a block diagram illustrating an electronic device 400 having an HDMI input for playing external AV signals from an external media source in accordance with an example of the present disclosure. In an example, the electronic device 400 may include: a scalar subsystem 401, an audio block 402, a central processing unit (CPU) 403, a liquid crystal display (LCD) panel 404, a headphone 405, a speaker 415, an on screen display (OSD) key control 406, a universal serial bus (USB) port 407, an external controller (EC) 408, and a power converter 409. In an example, the USB port 407 may connect a keyboard, a touchpad, a mouse, etc.

The scalar subsystem 401 may be part of the AV processor 31 for handling audio and video signals. In an example, the scalar subsystem 401 may include: a scalar integrated circuit (IC) 411, an OSD overlay 421, and an electrically erasable programmable read-only memory (EEPROM) 431. The scalar IC 411 may provide AV switching capabilities, which can be found inside consumer electronic devices such as televisions, video game consoles, digital video disc (DVD), or Blu-ray disc players, and can also be found in other AV equipment (such as video editing and television broadcasting equipment). The OSD overlay 421 may be a software menu for presenting the OSD key control 406 to a user. In an example, the scalar subsystem 401 may further include: a mobile high definition link (MHL) voltage converter 441. The MHL voltage converter 441 may be used when audio and/or video data are sent from an MHL compatible device (such as a mobile phone, a tablet, etc.) to a high resolution TV set or a monitor with an HDMI input.

The scalar IC 411 may include: an audio out port 451, a power enable general purpose input/output (GPIO) 461, an HDMI receiver 471, and a display converter 481. The display converter 481 is to provide such as an embedded display port (eDP) or low-voltage differential signaling (LVDS) for connections between the scalar IC 411 and the LCD panel 404. In an example, the eDP may be a standardized display panel interface for internal connections between such as graphics cards and notebook display panels. In an example, a OPIO of the scalar IC 411 may be a generic pin whose behavior, including whether it is an input or output pin, can be controlled by a user at run time.

The scalar IC 411 may connect to a multiplexer 491, and provide a source selection indicator to the multiplexer 491 to inform whether an external media source or an internal media source may be selected. The multiplexer 491 may provide brightness control signals to a backlight converter 414, to control brightness of the LCD panel 404. In electronics, a multiplexer (i.e., MUX) may be a device that selects one of several analog or digital input signals and forwards the selected input into a single line. The multiplexer may also be called a data selector. In an example, the multiplexer 491 may be a 2-channel analog multiplexer. In response to a control signal sent from a source selection GPIO of the scalar IC 411, the multiplexer 491 may receive inputs such as video control signals from a platform controller hub (PCH) 433 and the scalar IC 411, and forward a selected input to the LCD panel 404. The connection point between the PCH 433 and the multiplexer 491 is illustrated in FIG. 4 as C.

On the motherboard of the electronic device 400, there may be some other components. In an example, the computer subsystem 303 may include: the CPU 403, a display control unit 413, an operating system (OS) 423, the PCH 433, and a system power button 443. The display control unit 413 may be instructions executable by the CPU 403 for controlling audio and/or video parameters when the computer subsystem 303 is powered on. In an example, the PCH 433 may be similar to a south bridge, having south bridge features and managing I/O functions of the south bridge. The PCH 433 is connected to the CPU 403 via a direct media interface (DMI). The connection point between the PCH 433 and the CPU 403 is illustrated in FIG. 4 as D.

The OSD key control 406 may include: a multi-function OSD key, an up key, and a down key. The OSD key control 406 may send control signals to the scalar IC 411, and the connection point between the OSD key control 406 and the scalar IC 411 is illustrated in FIG. 4 as A. Specifically, the OSD key control 406 may be used to select a media source, and adjust audio parameters and/or video parameters of media playing devices. Also, the electronic device 400 may include: an Infra-Red (IR) receiver 426, to receive control signals from an IR remote control 416, and send the control signals via an Inter-Integrated Circuit (I2C) bus or a Universal Asynchronous Receiver/Transmitter (UART) to a GPIO of the scalar IC 411. The connection point between the IR receiver 426 and the scalar IC 411 is illustrated in FIG. 4 as B. In FIG. 4, the IR remote control 416 is described as an example for remote control. Commonly, remote controls are consumer IR devices which send digitally-coded pulses of infrared radiation to control functions such as power, volume, tuning, temperature set point, fan speed, or other features. In electronics, a remote control is a component of an electronic device such as a television set, DVD player, or other home appliance, used to operate the electronic device wirelessly from a short distance. Remote control is a convenience feature for a consumer, and can allow operation of devices that are out of convenient reach for direct operation of controls. In an example, remote control may also include Bluetooth connectivity, motion sensor-enabled capabilities and voice control.

Regarding the power converter 409, it may receive direct currents (DC) from a power adapter 419, and provide power supply to such as the scalar subsystem 401 and the CPU 403. In an example, the power adapter 419 is to receive an alternating current (AC) input, and generate a direct current (DC) with 19V for the power converter 409. In an example, the power converter 409 may be a DC-to-DC converter, or may be a linear voltage regulator such as a low dropout regulator (LDO), or may be a metal oxide semiconductor (MOS) gate. The DC-to-DC converter is an electronic circuit which converts a source of direct current (DC) from one voltage level to another according to practical requirements. In an example, the power converter 409 may turn 19V into 12V, 5V, 3.3V, 1.5V, 1.1V, etc. The power converter 409 is under the control of the external controller 408 (see connection point F).

The OSD key control 406, the IR remote control 416, and the USB port 407 may be used by a user to select a media source for a media playing device of the electronic device 400. The media playing device may include such as the LCD panel 404, the headphone 405, and the speaker 415. A speaker may be an electromechanical device which produces sound. In an example, the speaker 415 may be a woofer speaker, which is a loudspeaker designed to produce low frequency sounds. In another example, the speaker 415 may be a tweeter speaker, which is a special type of loudspeaker usually with dome or horn-type. The tweeter speaker may be designed to produce high audio frequencies. Further, the OSD key control 406, the IR remote control 416, and the USB port 407 may adjust audio or video parameters of the media playing device, such as the audio volume of the headphone 405, or the brightness of the LCD panel 404. The first control component 306 may include the OSD key control 406 and the IR remote control 416, which can work when the CPU 403 is powered on or off. The second control component 307 may include the USB port 407, which can work when the CPU 403 is powered on.

When an external media source is selected, the scalar IC 411 may send a source selection indicator to the multiplexer 491 and the audio block 402 (see connection point E), indicating that the media playing device is to play the external media source. Then, the HDMI input may be transmitted to the HDMI receiver 471, and split into audio signals and video signals. The audio signals of the HDMI input may be transmitted to the audio block 402 via the audio out port 451. The video signals of the HDMI input may be transmitted to the LCD panel 404 via the display converter 481.

When an internal media source is selected, the scalar IC 411 may send a source selection indicator to the multiplexer 491 and the audio block 402 (see connection point E), indicating that the media playing device is to play the internal media source. Then, the PCH 433 may provide high definition audio (HDA) to the audio block 402. The video signals of the internal media source may be provided by the CPU 403 to the scalar IC 411, and then transmitted to the LCD panel 404 via the display converter 481.

Audio control signals generated by the OSD key control 406 and/or the IR remote control 416 may be transmitted via the I2C from the scalar IC 411 to the external controller 408. Then, the external controller 408 may instruct the audio block 402 via the I2C to adjust the audio parameters according to the audio control signals. The scalar IC 411 may receive video control signals such as brightness control signals and panel enable signals from the OSD key control 406 and/or the IR remote control 416, and provide the video control signals to the multiplexer 491 for the internal or external media source. Also, the PCH 433 may provide video parameters of the internal or external media source generated by the second control component 307 to the multiplexer 491 via connection point C.

Figure 5:
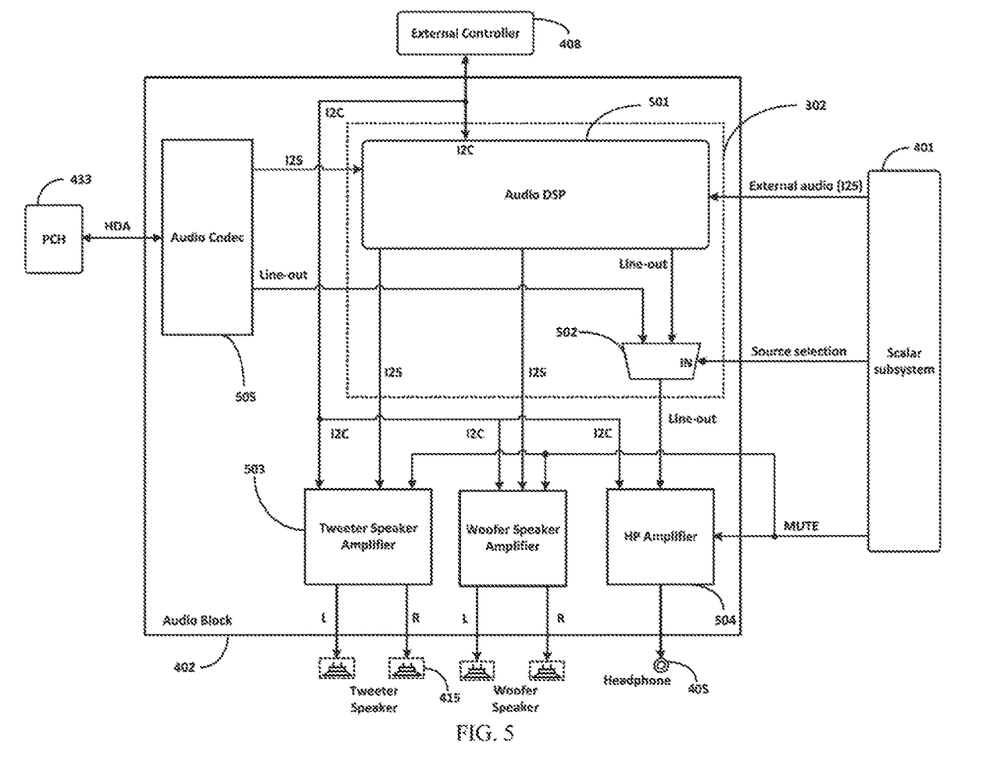
FIG. 5 is a block diagram illustrating the structure of an audio block of the electronic device shown in FIG. 4 in accordance with an example of the present disclosure.

FIG. 5 is a block diagram illustrating the structure of the audio block 402 in accordance with an example of the present disclosure. The audio block 402 may include: an audio multiplexer and control unit 302, a speaker amplifier 503, a headphone amplifier 504, and an audio codec 505.

In an example, the audio multiplexer and control unit 302 may include: an audio digital signal processing (DSP) 501, and an audio multiplexer 502. Line-out signals from the audio DSP 501 may be external audio signals, and line-out signals from the audio codec 505 may be internal audio signals. The internal audio signals may be transmitted from the PCH 433 to the audio codec 505. The audio multiplexer 502 may receive either the external audio signals or the internal audio signals under the control of a source selection indicator sent from the scalar subsystem 401, and send the selected audio signals to the headphone amplifier 504 to drive the headphone 405.

Also, the audio DSP 501 may receive the external audio signals from the scalar subsystem 401, and receive the internal audio signals from the audio codec 505 via an Inter-IC Sound (I2S) Bus. The audio DSP 501 may select audio signals for the speaker amplifier 503, and send the selected audio signals to the speaker amplifier 503 via the I2S to drive the speaker 415.

The external controller 408 may transmit audio control signals to the audio DSP 501, the speaker amplifier 503, and the headphone amplifier 504 via the I2C. The audio control signals may include audio volume value and audio mute status. In another example, the audio mute status may be transmitted to the speaker amplifier 503 and the headphone amplifier 504 via a GPIO of the scalar subsystem 401.

In another example, the audio multiplexer and control unit 302 may be implemented by another audio DSP without using a separate audio multiplexer for the headphone amplifier 504.

Figure 6:
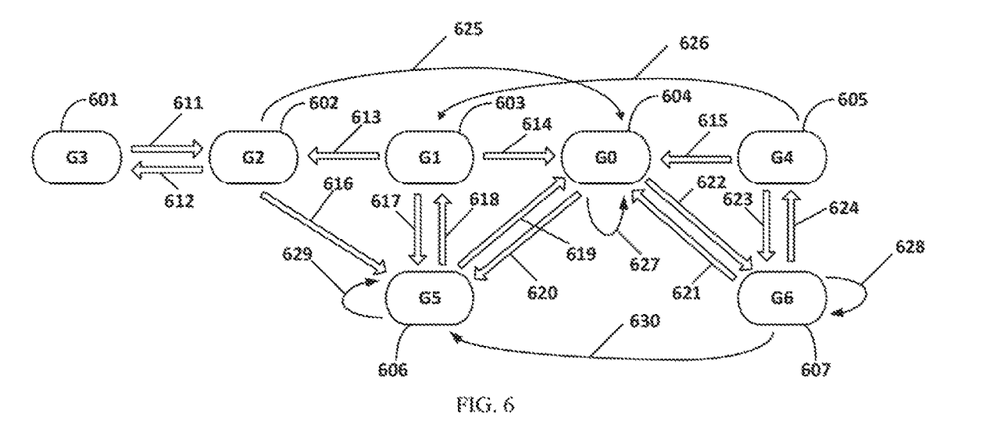
FIG. 6 presents a power state diagram for an all-in-one electronic device in accordance with an example of the present disclosure.

FIG. 6 presents a power state diagram for an electronic device 300 in accordance with an example of the present disclosure. In an example, the electronic device 300 may be an all-in-one computer. At block 601, the electronic device may be in a G3 state, which represents that the electronic device is mechanical off. In other words, no alternating current (AC) has been supplied to the electronic device in the G3 state. At block 602, the electronic device may be in a G2 state, which represents that the alternating current is plugged in and there is direct current (DC) transformed from the alternating current. In the G2 state, the AV processor 31 and the computer subsystem 303 of the electronic device 300 are both shut down. In an example, the G2 state may have AC power consumption no more than 0.5 W. At block 603, the electronic device 300 may be in a G1 state, which represents that the computer subsystem 303 is shut down while the AV processor 31 is sleep or standby. In the G1 state, the AC power consumption may be no more than 4 W. At block 604, the electronic device may be in a G0 state, which represents that both the computer subsystem 303 and the AV processor 31 are powered on. At block 605, the electronic device may be in a G4 state, which represents that both the computer subsystem 303 and the AV processor 31 are sleep or standby. At block 606, the electronic device may be in a G5 state, which represents that the computer subsystem 303 is shut down while the AV processor 31 is powered on. At block 607, the electronic device 300 may be in a G6 state, which represents that the computer subsystem 303 is sleep or standby while the AV processor 31 is powered on.

Table 1 illustrates implications of different power states of the electronic device 300.

TABLE 1

| Indicators of power states | Status of computer subsystem | Status of AV processor |
|---|---|---|
| G0 | On | On |
| G1 | Shut down | Sleep/Standby |
| G2 | Shut down | Shut down |
| G3 | AC not plugged in | AC not plugged in |
| G4 | Sleep/Standby | Sleep/Standby |
| G5 | Shut down | On |
| G6 | Sleep/Standby | On |

The electronic device 300 may transfer among power states G0-G6. When the direct current is on, the electronic device may transfer from G3 to G2 (611). When the direct current is off, the electronic device may transfer from G2 to G3 (612). When a power status of the AV processor 31 is changed from sleep to shut down, the electronic device 300 may transfer from G1 to G2 (613). When a system power button is pressed, the power status of the AV processor 31 changes from sleep to on and a power status of the computer subsystem 303 changes from shut down to powered on, the electronic device 300 may transfer from G1 to G0 (614). When a PC wake up event occurs, the power status of the AV processor 31 changes from sleep to on and the power status of the computer subsystem 303 changes from sleep to on, then the electronic device 300 may transfer from G4 to G0 (615). When an OSD key is pressed, the electronic device may transfer from G2 to G5 (616). When a scalar wake up event occurs, the media playing device may be assigned to the HDMI input, and the electronic device 300 may transfer from G1 to G5 (617). Conversely, when the HDMI input cannot be detected within a preset period of time, such as 10 seconds, the electronic device 300 may return to G1 from G5 (618). When the system power button is pressed under the circumstance that the electronic device 300 is within the G5 state, the electronic device may enter into G0 (619). On the other hand, the electronic device 300 may also change from 00 to 05 on the condition that the computer subsystem 303 is shut down (620). When the electronic device is previously in the G6 state and a PC wake up event occurs, the electronic device may step into G0 (621). Accordingly, the electronic device may return from G0 to G6 when the computer subsystem 303 comes into a sleep status (622). The conversion between G4 and G6 states may be triggered by the detection of the HDMI input (623 and 624), which may be the same as that described in 617 and 618. When the system power button is pressed, the electronic device 300 may transfer from G2 to G0 (625). When the computer subsystem 303 is shut down, the electronic device may transfer from G4 to G1 (626). When the electronic device is in G0, G5, G6 states while an input key is pressed, the electronic device may stay in the corresponding states and no transfer happens (627, 628, 629). When the computer subsystem 303 is shut down from sleep and the AV processor 31 remains power on, the electronic device 300 may transfer from G6 to G5 (630).

At blocks 603, 605, 606, and 607, the electronic device 300 is in a monitor mode. At block 604, the electronic device is in a PC mode. The monitor mode may refer to a situation that the computer subsystem 303 is powered off, including shut down status and sleep status, while the electronic device 300 can still function as a media playing device. In an example, the electronic device in the monitor mode may act as a monitor for external media sources connected to the electronic device via such as an HDMI input. In other words, the monitor mode may be dedicated for displaying external media sources. The PC mode may refer to a situation that the computer subsystem 303 is powered on, and the media playing device may receive AV signals from either the computer subsystem 303 or from the HDMI input. In the PC mode, either external media sources or internal media sources may be played.

Figure 7:
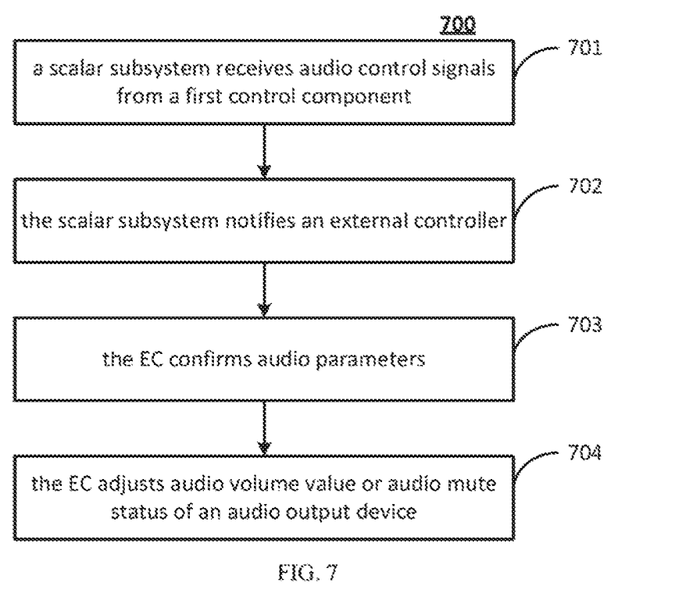
FIG. 7 is a flow chart illustrating an example process of controlling audio parameters via a first control component when external AV signals are played on media playing devices.

FIG. 7 is a flow chart illustrating an example process 700 of controlling audio parameters via a first control component when external AV signals are played on a media playing device. That is, the selected AV signals illustrated in FIG. 3 are the external AV signals. At block 701, a scalar subsystem may receive audio control signals from the first control component. In an example, an OSD key may be pressed to generate the audio control signals. In another example, an 1R remote control may be applied to generate the audio control signals. At block 702, the scalar subsystem may issue an interrupt command to notify an external controller (EC) of audio parameters. At block 703, the EC may confirm the audio parameters sent from the scalar subsystem via I2C. At block 704, the EC may adjust audio volume value or audio mute status in response to the press of the OSD key or the IR remote control. In an example, the audio volume value and the audio mute status may be kept in a non-volatile memory of the scalar subsystem, such as the EEPROM. The default value of the audio volume value may be 70, and the default value of the audio mute status may be "not mute".

Figure 8:
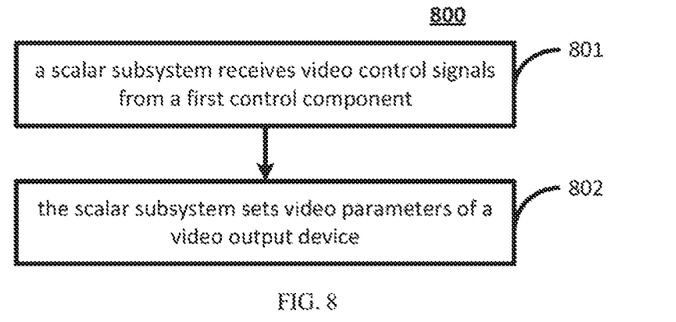
FIG. 8 is a flow chart illustrating an example process of controlling video parameters via a first control component when external AV signals are played on media playing devices.

FIG. 8 is a flow chart illustrating an example process 800 of controlling video parameters via a first control component when external AV signals are played on a media playing device. At block 801, a scalar subsystem may receive video control signals from the first control component. At block 802, the scalar subsystem may set video parameters of a video output device. In an example, the video parameters may be backlight brightness value kept in a non-volatile memory of the scalar subsystem, having a default value of 100.

Figure 9:
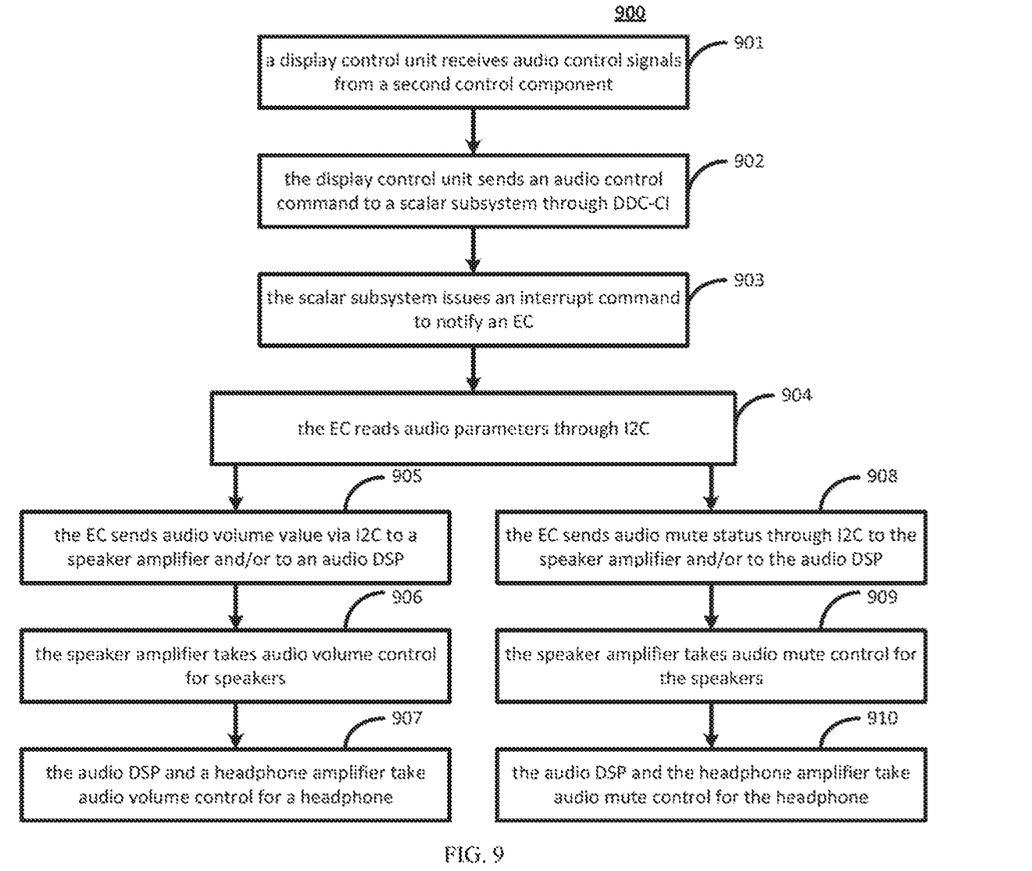
FIG. 9 is a flow chart illustrating an example process of controlling audio parameters via a second control component when external AV signals are played on media playing devices.

FIG. 9 is a flow chart illustrating an example process 900 of controlling audio parameters via a second control component when external AV signals are played on a media playing device. At block 901, a display control unit may receive audio control signals from the second control component. The second control component may be a Bluetooth (BT) remote control, or a USB port for connecting such as a keyboard, a mouse, etc. At block 902, the display control unit may send an audio control command through a display data channel command interface (DDC-CI) to the scalar subsystem. The audio control command may include audio parameters such as audio volume value and/or audio mute status. At block 903, the scalar subsystem may issue an interrupt command to notify an EC of the audio parameters. At block 904, the EC may read the audio parameters through I2C. At block 905, the EC may send the audio volume value via I2C to a speaker amplifier and/or to an audio DSP. At block 906, the speaker amplifier may take audio volume control for speakers. At block 907, the audio DSP and a headphone amplifier may take audio volume control for a headphone. At block 908, the EC may send the audio mute status through I2C to the speaker amplifier and/or to the audio DSP. At block 909, the speaker amplifier may take the audio mute control for speakers. At block 910, the audio DSP and the headphone amplifier may take the audio mute control for the headphone. Blocks 905-910 relate to the adjustment of the audio parameters for audio output devices through I2C, including operations such as setting the audio volume value and/or changing the audio mute status.

Figure 10:
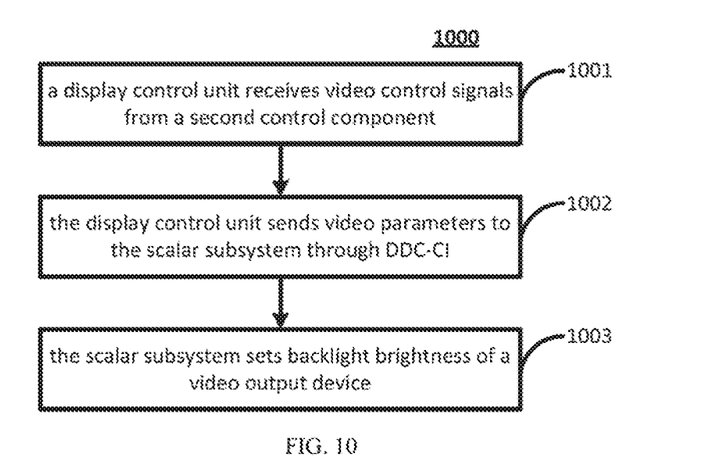
FIG. 10 is a flow chart illustrating an example process of controlling video parameters via a second control component when external AV signals are played on media playing devices.

FIG. 10 is a flow chart illustrating an example process 1000 of controlling video parameters via a second control component when external AV signals are played on a media playing device. At block 1001, a display control unit may receive video control signals from the second control component. At block 1002, the display control unit may send video parameters to the scalar subsystem through DDC-CI. At block 1003, the scalar subsystem may set backlight brightness of a video output device according to the video parameters.

Figure 11:
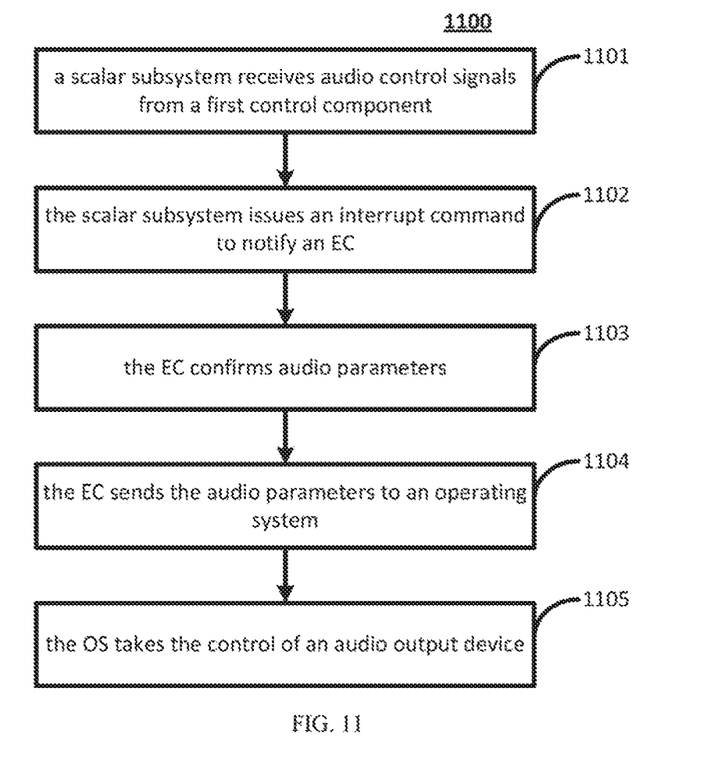
FIG. 11 is a flow chart illustrating an example process of controlling audio parameters via a first control component when internal AV signals are played on media playing devices.

FIG. 1 is a flow chart illustrating an example process 1100 of controlling audio parameters via a first control component when internal AV signals are played on a media playing device. At block 1101, a scalar subsystem may receive audio control signals from the first control component. At block 1102, the scalar subsystem may issue an interrupt command to notify an EC of audio parameters. At block 1103, the EC may confirm the audio parameters received from the scalar subsystem via I2C. At block 1104, the EC may send the audio parameters to an operating system (OS) of the computer subsystem. At block 1105, the OS may take the control of an audio output device. The process of controlling video parameters via a first control component when internal AV signals are played on a media playing device may be similar to that shown in FIG. 11. The video parameters may include backlight brightness value of a video output device.

Figure 12:
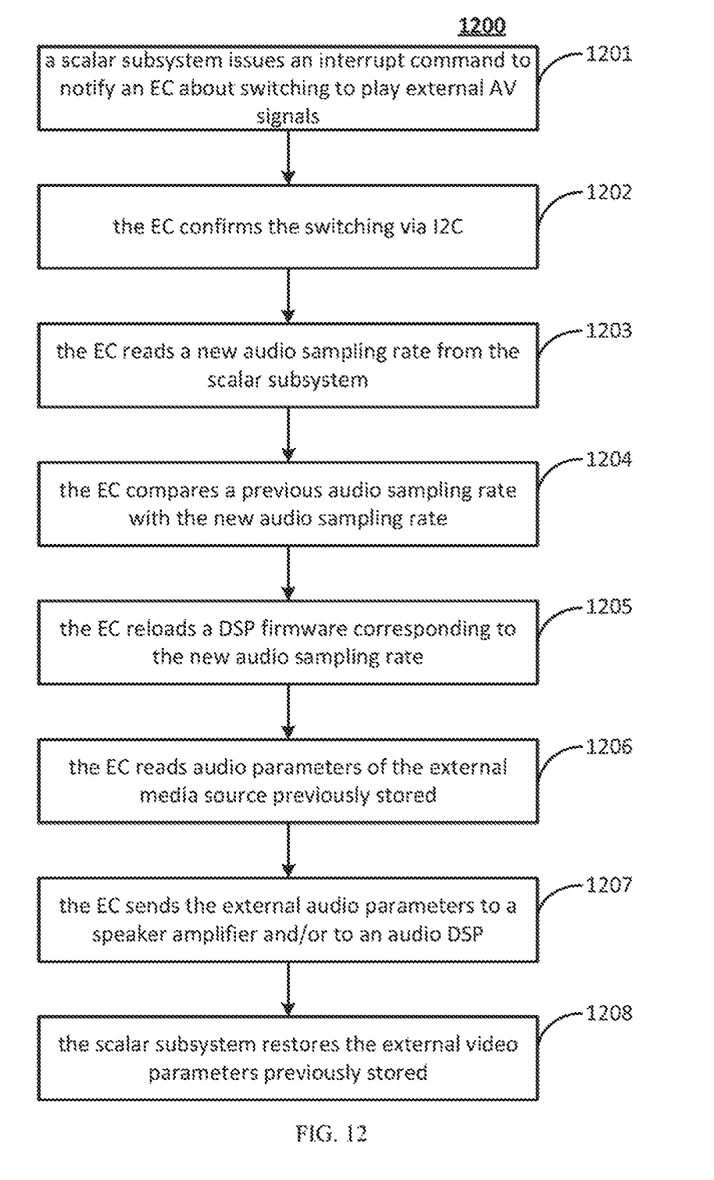
FIG. 12 is a flow chart illustrating an example process of switching from playing internal AV signals or no display to playing external AV signals.

FIG. 12 is a flow chart illustrating an example process 1200 of switching from playing internal AV signals or no display to playing external AV signals. At block 1201, a scalar subsystem may issue an interrupt command to notify an EC about switching a media playing device to play the external AV signals. At block 1202, the EC may confirm the switching sent from the scalar subsystem via I2C. At block 1203, the EC may read a new audio sampling rate from the scalar subsystem. At block 1204, the EC may compare a previous audio sampling rate with the new audio sampling rate. At block 1205, the EC may reload a DSP firmware corresponding to the new audio sampling rate to an audio DSP when the previous and new audio sampling rates are different. In an example, the DSP firmware may have 44.1 khz or 48 khz sampling rate. At block 1206, the EC may read audio parameters of the external media source previously stored in the scalar subsystem. At block 1207, the EC may send the external audio parameters previously stored to a speaker amplifier and/or to an audio DSP via I2C. At block 1208, the scalar subsystem may restore the external video parameters previously stored. At blocks 1206-1208, default audio parameters and video parameters may be set according to latest configurations of the external media source stored on the scalar subsystem. In an example, external AV parameters may be stored on the scalar subsystem when a change of the external AV parameters occurs during the play of the external AV signals. Thereafter, the external AV parameters may be recorded by the scalar subsystem for future use even when the playing of the external AV signals is terminated. In an example, when the playing is switched from the internal media source to the external media source, the external AV parameters previously stored may be used.

Figure 13:
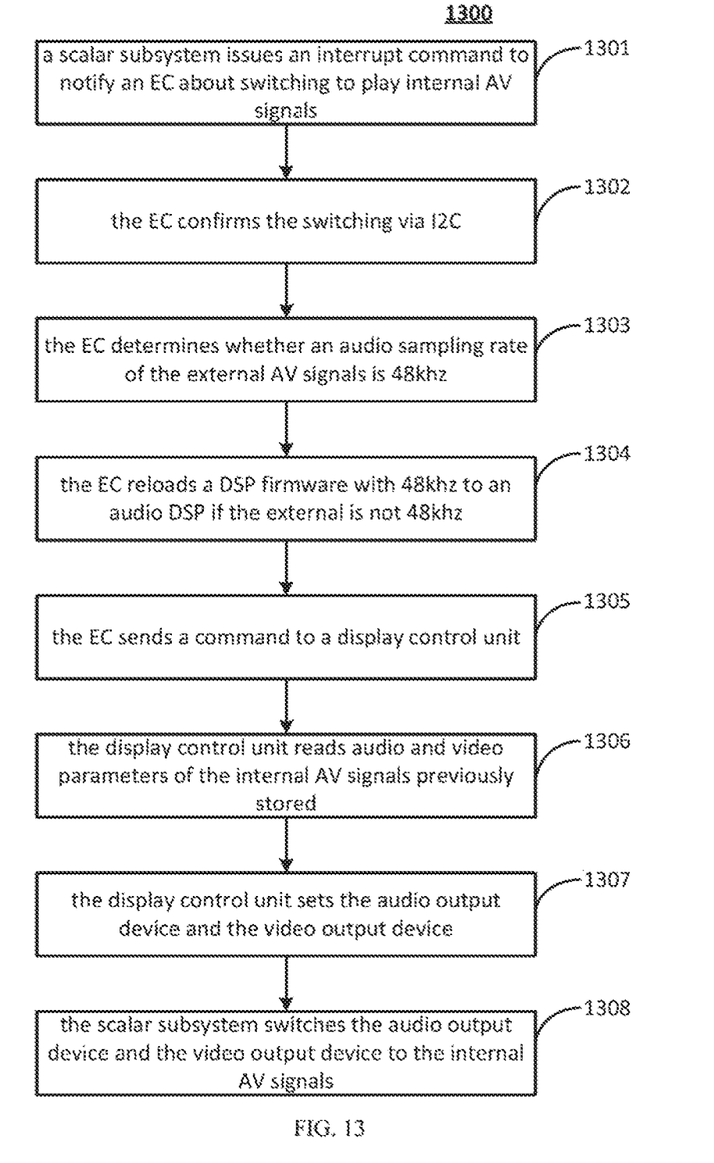
FIG. 13 is a flow chart illustrating an example process of switching from playing external AV signals or no display to playing internal AV signals.

FIG. 13 is a flow chart illustrating an example process 1300 of switching from playing external AV signals or no display to playing internal AV signals. At block 1301, a scalar subsystem may issue an interrupt command to notify an EC about switching display from the external AV signals or no display to the internal AV signals. At block 1302, the EC may confirm the switching via I2C. At block 1303, the EC may determine whether an audio sampling rate of the external AV signals is 48 khz. At block 1304, the EC may reload a DSP firmware with 48 khz to an audio DSP for playing the internal audio signals when the external AV signals don't have the audio sampling rate of 48 khz. At block 1305, the EC may send a command to a display control unit. At block 1306, the display control unit may read audio parameters and video parameters of the internal AV signals previously stored in the scalar subsystem through DDC-CI. In an example, the audio parameters and video parameters of the internal AV signals may previously be stored in the scalar subsystem when there is a change on the audio and video parameters during the display of the internal AV signals. At block 1307, the display control unit may set the audio output device and the video output device to match the audio and video parameters previously stored in the scalar subsystem. At block 1308, the scalar subsystem may switch the audio output device and the video output device to the internal AV signals.

Figure 14:
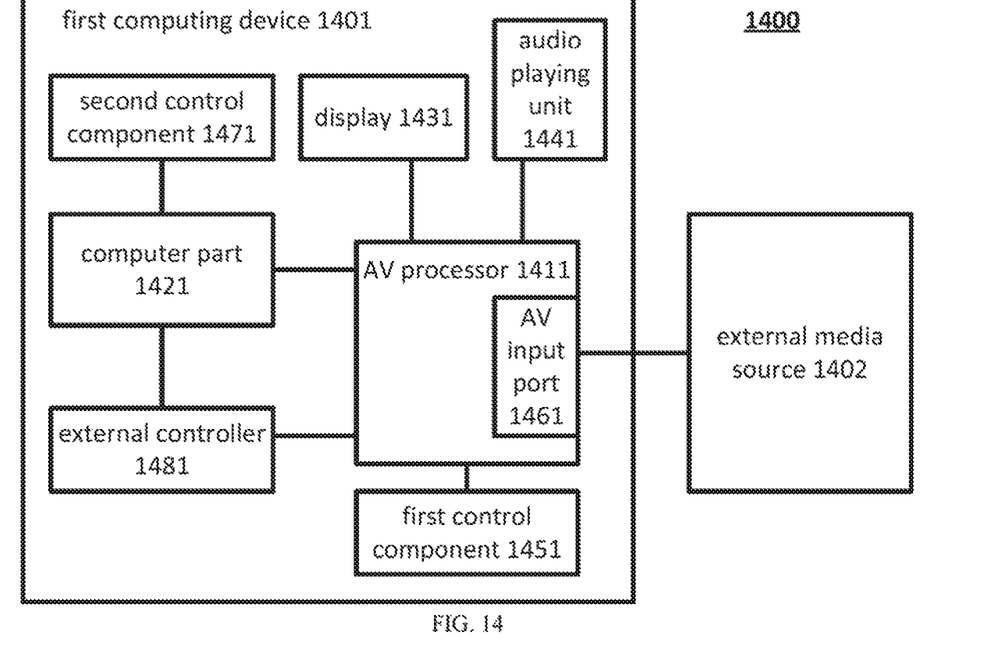
FIG. 14 is a block diagram illustrating a system in accordance with an example of the present disclosure.

FIG. 14 is a block diagram illustrating a system 1400 in accordance with an example of the present disclosure. The implementation of the system 1400 may refer to such as FIGS. 1-13 for details. In an example, the system 1400 may include: a first computing device 1401 and an external media source 1402.

The first computing device 1401 may include: an AV processor 1411, a computer part 1421, a display 1431, an audio playing unit 1441, and a first control component 1451. The AV processor 1411 may include an AV input port 1461. The first control component 1451 is coupled to the AV processor 1411. The external media source 1402 is coupled to the AV input port 1461. The external media source 1402 may transmit external AV signals to the AV processor 1411 under the control of the first control component 1451. The AV processor 1411 is to split the external AV signals into external audio signals and external video signals, transmit the external audio signals to the audio playing unit 1441, and transmit the external video signals to the display 1431, when the external media source is selected.

In an example, when the external media source is selected, the computer part 1421 may be powered on, or powered off. For example, when the computer part 1421 is powered on, the external media source 1402 may occupy the display 1431 and the audio playing unit 1441 if a user selects to display the external media source 1402 via such as the first control component 1451. In an example, the external media source is selected from the group including: a game console, a media player, a set-top box, a digital television, a smart phone, and a second computing device distinct from the first computing device 1401.

In an example, the first computing device 1401 may further include: a second control component 1471 coupled to the computer part 1421. The second control component 1471 is to control audio parameters of the audio playing unit 1441 and video parameters of the display 1431 when the computer part 1421 is powered on.

In an example, the first computing device 1401 may further include: an external controller 1481, to act as a master for transmitting control signals to the AV processor 1411 and the computer part 1421. In an example, the external controller 1481 may send the control signals via I2C. The external controller 1481 may be configured as a master of the I2C, and other components may be configured as slaves of the I2C.

Figure 15:
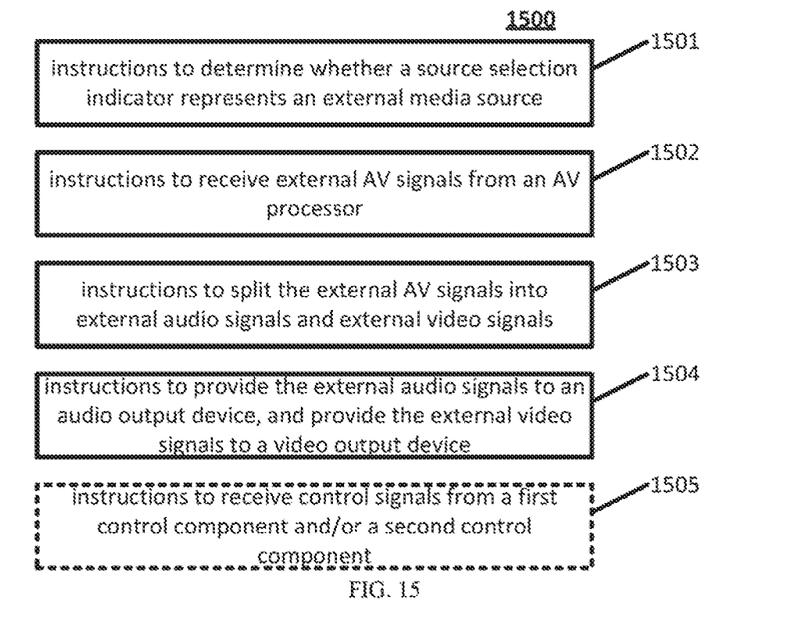
FIG. 15 is a block diagram illustrating a computer readable storage medium in accordance with an example of the present disclosure.

FIG. 15 is a block diagram illustrating a computer readable storage medium 1500 in accordance with an example of the present disclosure. In an example, the computer readable storage medium 1500 may be a non-transitory computer-readable storage medium. Specifically, the computer readable storage medium 1500 may be a magnetic disk storage device, a flash memory device, or other non-volatile or non-transitory solid state memory devices. The implementation of the computer readable storage medium 1500 may refer to such as FIGS. 1-14 for details.

In an example, the computer readable storage medium 1500 may include instructions that when executed cause a controller of an electronic device to: determine whether a source selection indicator represents an external media source not integrated within the electronic device or an internal media source included in the electronic device (block 1501). The instructions may further cause the controller to: receive external audio and video (AV) signals from an AV processor of the electronic device when the source selection indicator represents the external media source (block 1502), wherein the AV processor is coupled to the external media source. The instructions may further cause the controller to: split the external AV signals into external audio signals and external video signals by the AV processor (block 1503). The instructions may further cause the controller to: provide the external audio signals to an audio output device, and provide the external video signals to a video output device (block 1504).

In an example, the instructions may further cause the controller to: receive control signals from a first control component and/or a second control component of the electronic device, and transmit the control signals to the audio output device and/or the video output device (block 1505). The first control component is connected to the AV processor of the electronic device, and the second control component is connected to a computer part of the electronic device.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the present disclosure and its practical applications, to thereby enable others skilled in the art to best utilize the present disclosure and various examples with various modifications as are suited to the particular use contemplated. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An electronic device, comprising:
    an audio and video (AV) processor, to process AV signals, the AV processor comprising an AV input port to receive external AV signals from an external media source;
    a computer subsystem comprising a central processing unit (CPU) to execute an operating system of the electronic device, wherein the computer subsystem is to provide internal AV signals to the AV processor;
    a control component, to control the AV processor to select between the external AV signals and the internal AV signals, and enable the AV processor to transmit selected AV signals to a media playing device;
    the media playing device, to play the selected AV signals; and
    a power supply component, to provide power input to the AV processor and the computer subsystem separately such that when the computer subsystem is powered off, the AV processor is powered on to receive the external AV signals from the external media source and play the external AV signals on the media playing device,
    wherein, when the external AV signals is selected to be played on the media playing device and the AV processor receives an audio volume control of the external AV signals from the control component, the AV processor generates an interrupt command to notify an external controller of the audio volume control of the external AV signals, causes the external controller to confirm the audio volume control of the external AV signals, and adjusts an audio volume of the media playing device based on the audio volume control of the external AV signals that was confirmed by the external controller.

2. The electronic device according to claim 1, wherein the control component comprises:
    a first control component, coupled to the AV processor and to instruct the AV processor to select between the external AV signals and the internal AV signals.

3. The electronic device according to claim 2, wherein the control component comprises:
    a second control component, coupled to the computer subsystem and to instruct the AV processor to select between the external AV signals and the internal AV signals when the computer subsystem is powered on.

4. The electronic device according to claim 1, wherein the media playing device comprises: a video output device to display video signals, and an audio output device to play audio signals.

5. The electronic device according to claim 4, wherein the AV processor comprises:
    an AV splitter, to split the external AV signals into external audio signals and external video signals;
    a video multiplexer and control unit, to receive the external video signals from the AV splitter, to receive internal video signals from the computer subsystem, to receive video control signals from the control component, and to transmit selected video signals to the video output device according to the video control signals; and
    an audio multiplexer and control unit, to receive the external audio signals from the AV splitter, to receive internal audio signals from the computer subsystem, to receive audio control signals from the control component, and to transmit selected audio signals to the audio output device according to the audio control signals.

6. The electronic device according to claim 5, wherein the computer subsystem comprises:
    the CPU, to provide the internal video signals to the video multiplexer and control unit;
    a platform controller hub, to provide the internal audio signals to the audio multiplexer and control unit; and
    a display control unit running on the operating system, to receive audio parameters and video parameters from a second control component, provide the audio parameters to the audio multiplexer and control unit, and provide the video parameters to the video multiplexer and control unit.

7. The electronic device according to claim 4, wherein the control component is further to adjust audio parameters of the audio output device, and to adjust video parameters of the video output device.

8. A system, comprising:
    a first computing device, comprising: a display, an audio playing unit, an audio and video (AV) processor to select between external AV signals and internal AV signals to send to the display and the audio playing unit, a computer subsystem comprising a central processing unit (CPU) to execute an operating system of the first computing device and generating the internal AV signals, a power supply component, and a first control component, wherein the AV processor comprises an AV input port, and the first control component is coupled to the AV processor;
    an external media source coupled to the AV input port of the AV processor of the first computing device, wherein the external media source is to transmit the external AV signals to the AV processor under the control of the first control component; and
    the AV processor is to split the external AV signals into external audio signals and external video signals, transmit the external audio signals to the audio playing unit and transmit the external video signals to the display when the external media source is selected, and
    wherein the power supply component of the first computing device is to provide power input to the AV processor and the computer subsystem separately such that when the computer subsystem is powered off, the AV processor is powered on to receive the external AV signals from the external media source and play the external AV signals on the display and audio playing unit, and wherein, in response to the AV processor receiving an audio volume control of the external AV signals from the first control component, the AV processor generates an interrupt command to notify an external controller of the audio volume control of the external AV signals, causes the external controller to confirm the audio volume control of the external AV signals, and adjusts an audio volume of the audio playing unit based on the audio volume control of the external AV signals that was confirmed by the external controller.

9. The system according to claim 8, wherein the external media source is selected from the group comprising: a game console, a media player, a set-top box, a digital television, a smart phone, and a second computing device distinct from the first computing device.

10. The system according to claim 8, wherein the first computing device further comprises: a second control component coupled to the computer subsystem, wherein the second control component is to control audio parameters of the audio playing unit and video parameters of the display when the computer subsystem is powered on.

11. The system according to claim 8, wherein the external controller acts as a master for transmitting control signals to the AV processor and the computer subsystem.

12. A non-transitory computer readable storage medium storing instructions that when executed cause a controller of an electronic device to:

determine whether a source selection indicator represents an external media source not integrated within the electronic device or an internal media source included in the electronic device, wherein the internal media source is a computer subsystem of the electronic device that comprises a central processing unit (CPU) to execute an operating system of the electronic device and generate internal audio and video (AV) signals;

receive external AV signals from the external media source via an AV processor of the electronic device when the source selection indicator represents the external media source, wherein the AV processor is coupled to the external media source;

split the external AV signals into external audio signals and external video signals by the AV processor;

provide the external audio signals to an audio output device, and provide the external video signals to a video output device;

receive an audio volume control of the external audio signals from a first control component in the electronic device;

generate an interrupt command to notify an external controller of the audio volume control of the external audio signals for the external controller to confirm the audio volume control of the external audio signals;

adjust an audio volume of the audio output device based on the audio volume control that was confirmed by the external controller; and provide power input from a power supply component of the electronic device to the AV processor and the computer subsystem separately such that when the computer subsystem is powered off, the AV processor is powered on to receive the external AV signals from the external media source and play the external AV signals on the audio output device and the video output device.

13. The non-transitory computer readable storage medium according to claim 12, wherein the instructions further cause the controller to:

receive control signals from a second control component of the electronic device, wherein the second control component is connected to the computer subsystem of the electronic device that generates the internal AV signals; and transmit the control signals to the audio output device and the video output device.

* * * * *